(12) United States Patent
Rogers

(10) Patent No.: US 8,100,623 B2
(45) Date of Patent: Jan. 24, 2012

(54) RECYCLE CONTAINER TRANSFER VEHICLE

(76) Inventor: Ralph R. Rogers, Dakota Dunes, SD (US)

(*) Notice: Subject to any disclaimer, the term of this patent is extended or adjusted under 35 U.S.C. 154(b) by 320 days.

(21) Appl. No.: 12/462,711

(22) Filed: Aug. 7, 2009

(65) Prior Publication Data

US 2011/0033272 A1 Feb. 10, 2011

(51) Int. Cl.
*B60P 1/48* (2006.01)
*B60P 1/64* (2006.01)

(52) U.S. Cl. .......................... 414/425; 414/470

(58) Field of Classification Search ............... 298/17.6, 298/18; 414/425, 470
See application file for complete search history.

(56) References Cited

U.S. PATENT DOCUMENTS

| 2,530,613 | A | * | 11/1950 | Hopper | 298/18 |
| 4,200,334 | A | * | 4/1980 | Lindholm | 298/7 |
| 6,089,670 | A | * | 7/2000 | Rogers | 298/11 |
| 2001/0041127 | A1 | * | 11/2001 | Cross | 414/470 |

FOREIGN PATENT DOCUMENTS

DE 4100100 A1 * 7/1992

* cited by examiner

*Primary Examiner* — James Keenan
(74) *Attorney, Agent, or Firm* — Dennis L. Thomte; Thomte Patent Law Office LLC

(57) ABSTRACT

A wheeled vehicle such as a truck or trailer is disclosed including an apparatus thereon which may be connected to a recycle container so that the recycle container may be lifted from the ground onto the vehicle and then transported to a processing site. Once at the processing site, the apparatus causes the refuse container to be pivotally moved with respect to the vehicle so that the contents of the container are dumped from the container without the removal of the container from the vehicle.

4 Claims, 5 Drawing Sheets

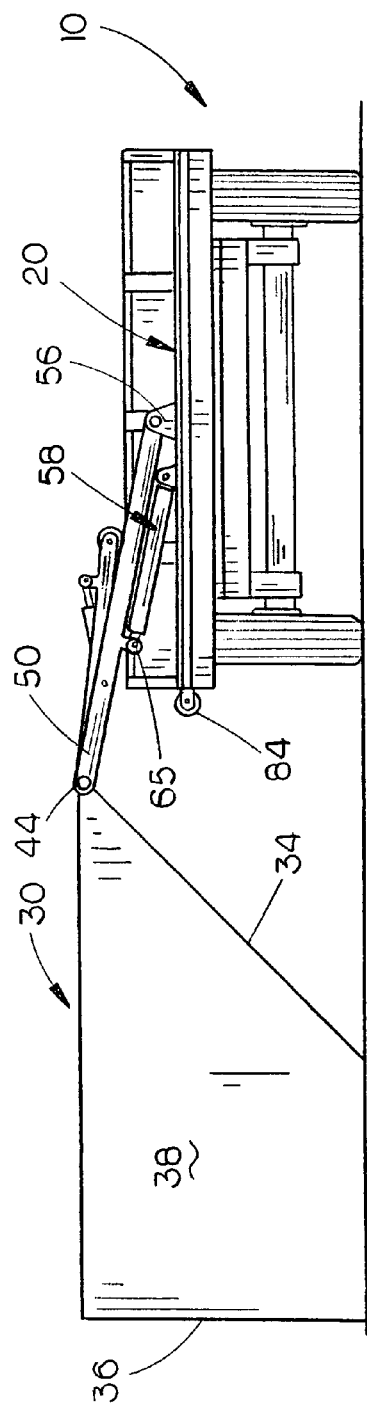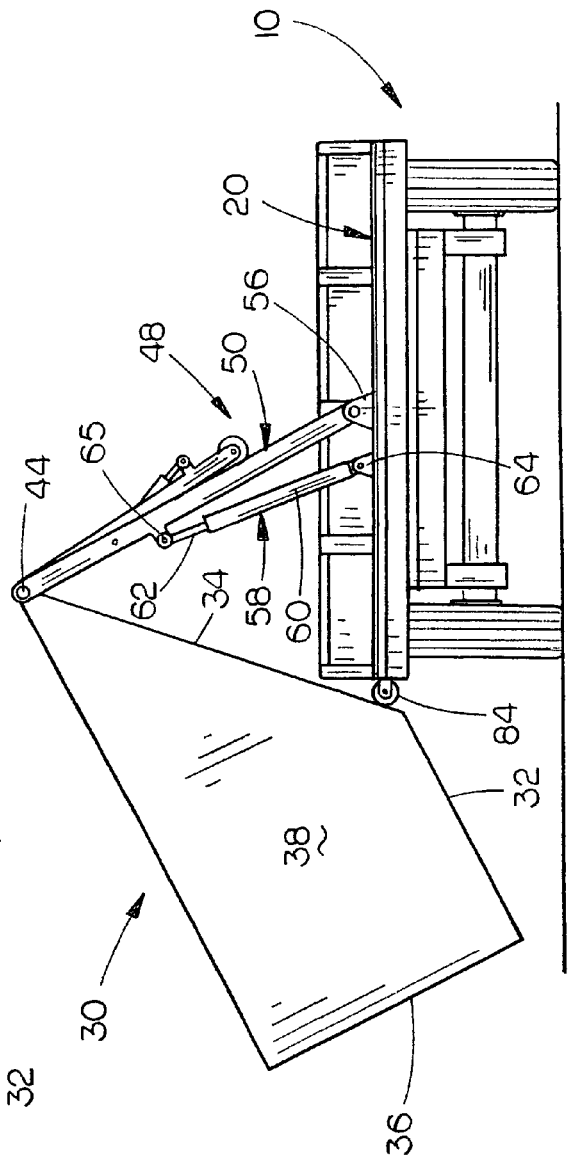

US 8,100,623 B2

RECYCLE CONTAINER TRANSFER VEHICLE

BACKGROUND OF THE INVENTION

1. Field of the Invention

This invention relates to a recycle container transfer vehicle and more particularly to a recycle container transfer vehicle such as a trailer or truck. More particularly, this invention relates to a wheeled vehicle which is adapted to raise a loaded recycle container from the ground onto the vehicle from one side thereof with the loaded container then being transported to a remote location wherein the contents of the container may be dumped from the opposite side of the vehicle. After the contents of the container have been dumped therefrom, the empty container is repositioned on the vehicle and transported to a desired collection location with the empty container then being moved from the vehicle to the ground.

2. Description of the Related Art

Recycle containers are usually placed at a collection site wherein items to be recycled may be placed therein. When the recycle container is full, it must usually be transported by some means to a site wherein the materials are recycled or processed. To date, it is not believed that there has been provided a convenient way of transporting the filled recycle containers between the collection site and the processing site and for emptying the contents of the container at the processing site.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A recycle container transfer vehicle such as a trailer or truck is described for: (1) raising a loaded recycle container from the ground onto a support on a wheeled vehicle, from one side thereof; (2) transporting the vehicle with the loaded container thereon to a remote location; (3) dumping the contents of the container from an opposite side of the support on the vehicle; (4) repositioning the dumped container on the vehicle; (5) transporting the empty container to a desired location; and (6) moving the empty container from the support on the vehicle to the ground.

It is therefore a principal object of the invention to provide an improved wheeled vehicle such as a trailer or truck to transport a filled recycle container from a collection site to a processing site and to provide a convenient means for positioning the recycle container on the vehicle and for dumping the contents of the container therefrom.

A further object of the invention is to provide a recycle container transfer vehicle which conveniently picks up a loaded container from one side of the vehicle, places the loaded container onto the vehicle with the vehicle then being transported to a processing site wherein the contents of the container are dumped from the opposite side of the vehicle.

A further object of the invention is to provide a recycle container transfer vehicle which may be used with conventional recycle containers.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a rear perspective view of a wheeled vehicle having an apparatus thereon which is connected to a filled recycle container at one side of the vehicle with the recycle container resting on a supporting surface such as the ground or the like;

FIG. 2 is a rear view illustrating the recycle container resting on a supporting surface with the apparatus being in its initial pickup position;

FIG. 3 is a view similar to FIG. 2 except that the recycle container is being moved upwardly from the supporting surface onto the vehicle;

DESCRIPTION OF THE PREFERRED EMBODIMENT

Figure 1:
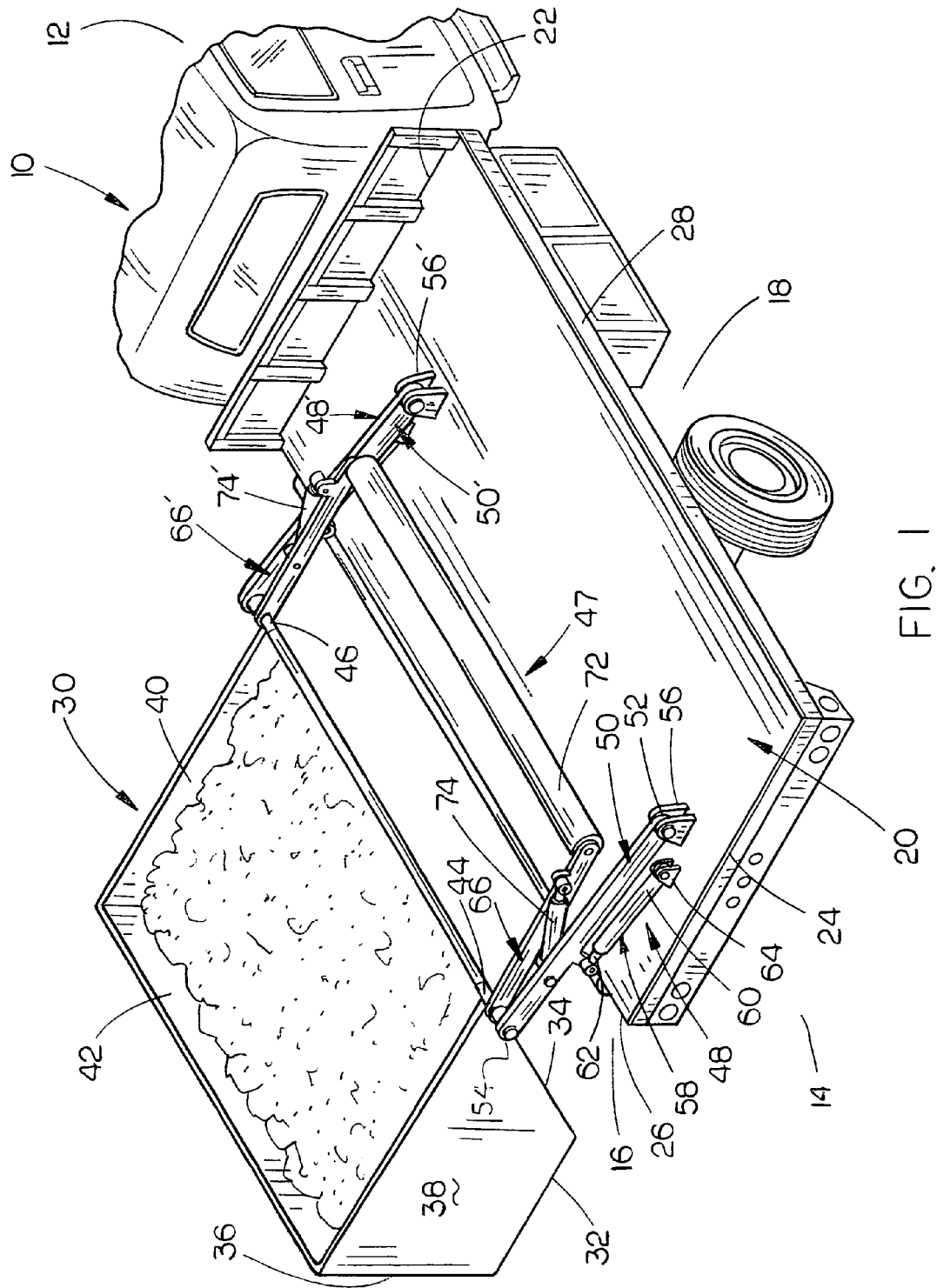

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a wheeled vehicle such as a truck or trailer having a forward end 12, a rearward end 14, a first side 16 and a second side 18. The numeral 20 refers to a container support or bed positioned on the vehicle 10 and which has a forward end 22, a rearward end 24, a first side 26 and a second side 28.

The numeral 30 refers to a conventional recycle container which is shown to be filled in FIG. 1 with recycled materials. Container 30 includes a bottom wall 32, an inclined front wall 34, a back wall 36, side walls 38 and 40 and an upper end 42 which may be selectively closed by a cover or the like. Normally, the container 30 includes horizontally extending pins 44 and 46 at the opposite ends of the upper end of front wall 34.

The numeral 47 refers to the container lifting and dumping apparatus of this invention. Apparatus 47 includes a mechanism 48 at the rearward end of the support 20 and a mechanism 48' at the forward end of the support 20 as seen in FIG. 1. Inasmuch as mechanisms 48 and 48' are identical, only mechanism 48 will be described in detail with "'" being used to identify identical structure on the mechanism 48'.

Mechanism 48 includes an elongated arm 50 having a first end 52 and a second end 54. End 52 of arm 50 is pivotally secured to bracket 56 which is secured to support 20. End 54 of arm 50 is selectively pivotally secured to pin 44 by any convenient means. The numeral 58 refers to a power cylinder such as an air cylinder or a hydraulic cylinder and which includes a cylinder portion 60 and a cylinder rod 62. One end of cylinder portion 60 is pivotally secured to a bracket 64 which is secured to support 20 as seen in FIG. 1. Rod 62 of power cylinder 58 is pivotally secured to arm 50 at 65.

Figure 5:
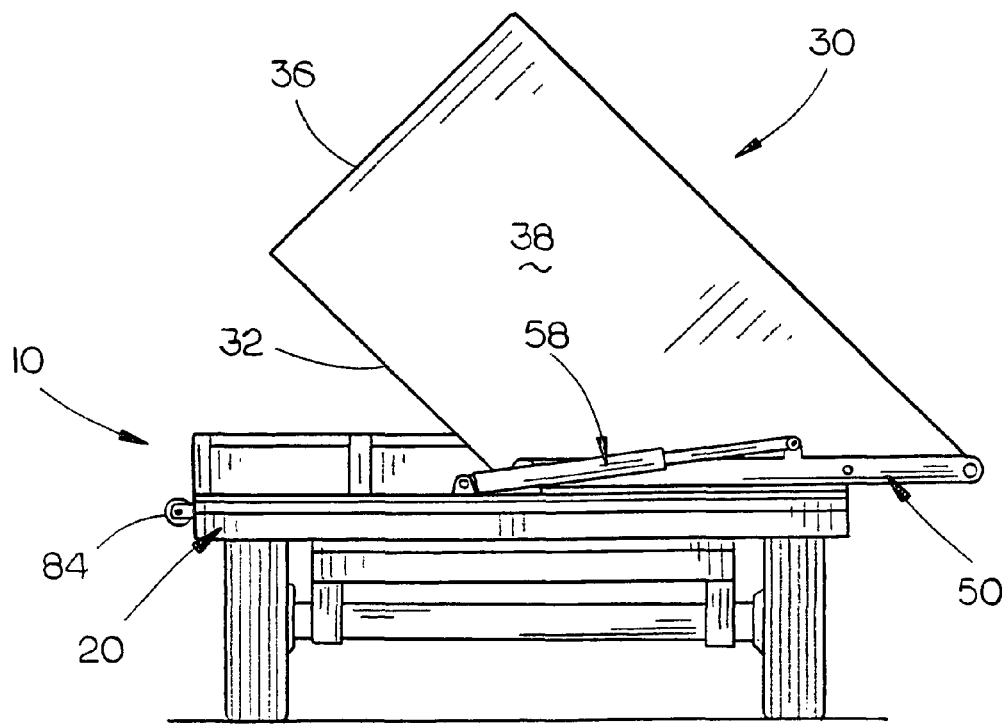
FIG. 5 is a view similar to FIG. 4 except that the recycle container has been moved approximately 45° towards its dumping position.
Figure 7:
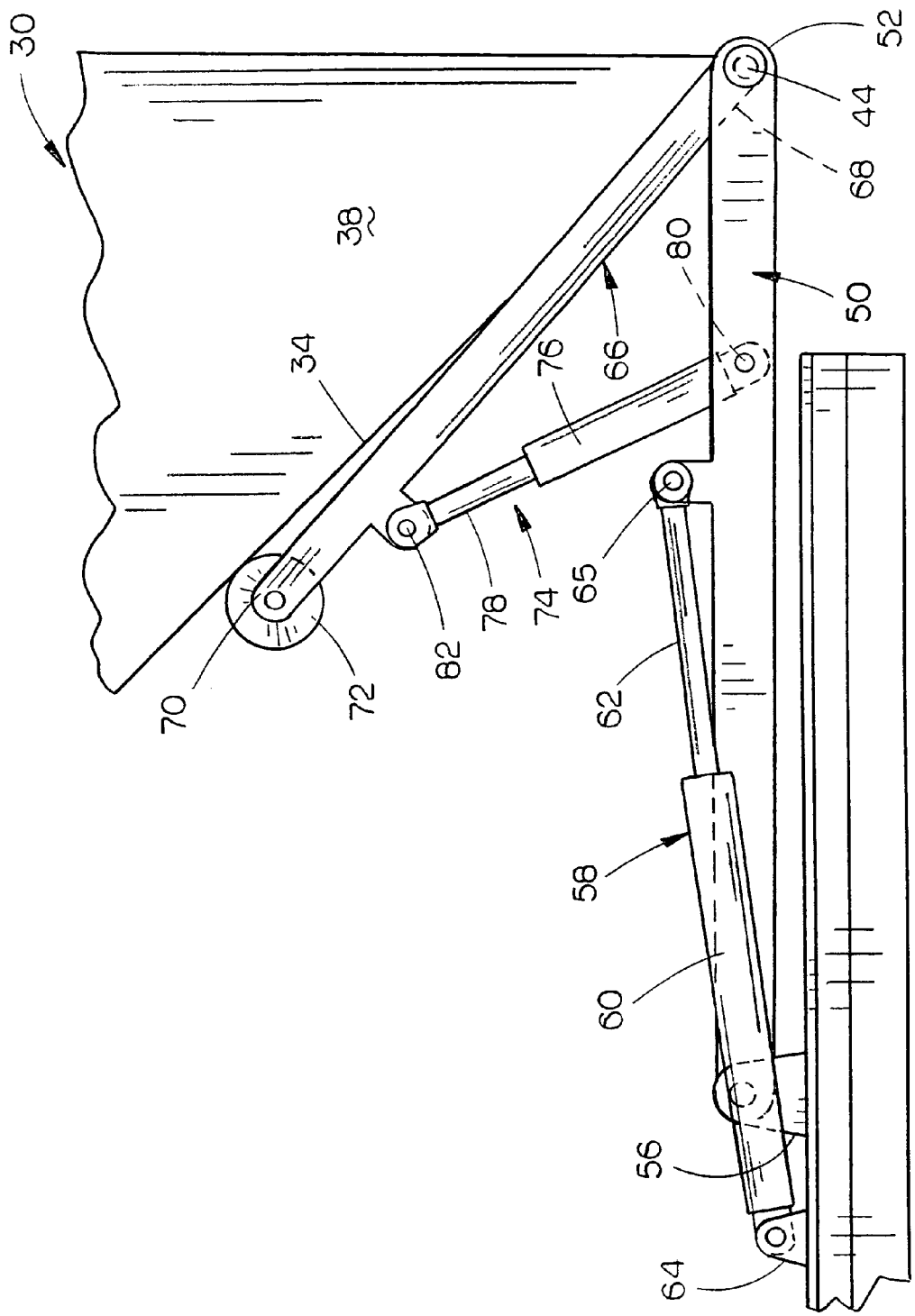
FIG. 7 is a partial enlarged view of FIG. 6.

The numeral 66 refers to an elongated arm having ends 68 and 70 as best seen in FIG. 7. End 68 of arm 66 is pivotally connected to end 52 of arm 50 and is pivotally connected to the pin 44 as well. One end of roller 72 is connected to end 70 of arm 66 as illustrated in FIG. 5. Although an elongated roller 72 is illustrated in FIG. 1, a single roller could be mounted at the end 70 of arm 66.

The numeral 74 refers to a power cylinder including a cylinder portion 76 and a cylinder rod 78 as seen in FIG. 7. The cylinder portion 76 of cylinder 74 is pivotally secured to arm 50 at 80. The end of cylinder rod 78 is pivotally connected to arm 66 at 82 (FIG. 7). The numeral 84 refers to an elongated roller which is mounted at the side 26 of support 20.

The apparatus of this invention will now be described in use. Assuming that the container 30 is filled with recycled materials and is resting on a supporting surface such as the ground or concrete, the vehicle 10 is driven or positioned adjacent the container 30 as illustrated in FIG. 1. Mechanisms 48 and 48' are then positioned as illustrated in FIG. 1 with the arms 50, 66, 50' and 66' being selectively pivotally secured to the pins 44 and 46. At this time, cylinders 74 and 74' will be in their retracted positions with the cylinders 58 and 58' also being in their retracted positions. The cylinders 58 and 58' are then extended so that the container 30 is moved from the position of FIGS. 1 and 2 towards the position of FIG. 3 with the exterior surface of front wall 34 engaging the roller 84. The cylinders 58 and 58' are then further extended so that the container 30 is moved from the position of FIG. 3 to the transport position illustrated in FIG. 4 wherein container 30 rests upon support or bed 20. The vehicle is then transported to a remote site or processing site with the container 30 being in the transport position of FIG. 4.

Figure 4:
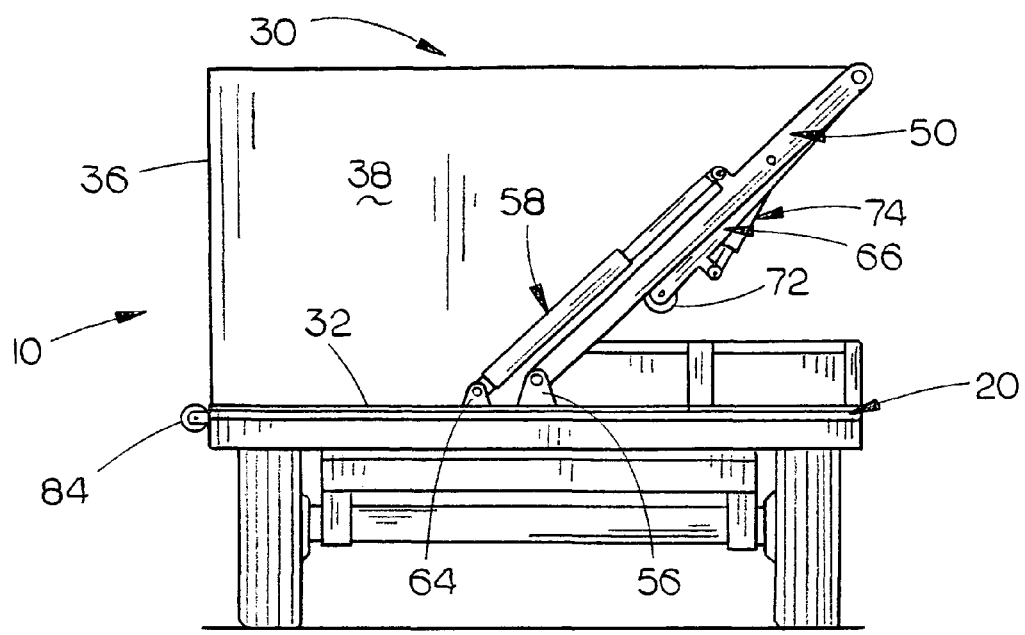
FIG. 4 is a view similar to FIGS. 2 and 3 except that the recycle container is illustrated as being in its transport position on the vehicle.

When the vehicle 10 arrives at the processing site and it is desired to dump the contents from the container 30, the cylinders 58 and 58' are then further extended to cause the container 30 to be pivotally moved from the position of FIG. 4 to the position of FIG. 5 so that the bottom wall 32 dwells in approximately 45° plane with respect to horizontal. With the container 30 in the position of FIG. 5 as well as by the dotted line position of FIG. 6, the power cylinders 74 and 74' are then extended which causes the arms 66 and 66' to pivotally move with respect to the arms 50 and 50' with the roller 72 engaging the exterior surface of front wall 34 to pivotally move the container 30 to the solid line position illustrated in FIG. 6 and in FIG. 7 so that the contents of the container 30 are dumped therefrom.

Figure 6:
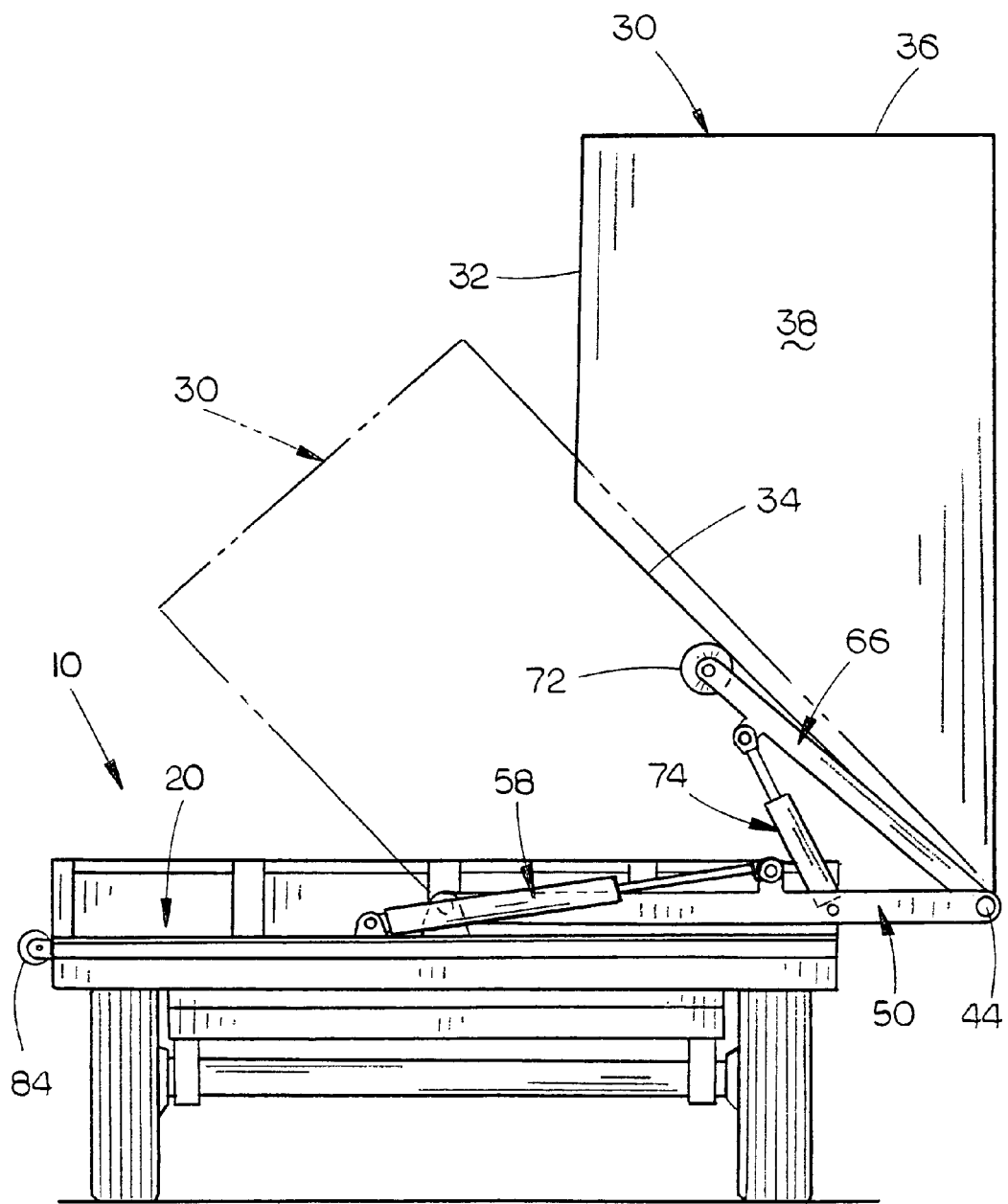
FIG. 6 is a view similar to FIG. 5 except that the recycle container has been moved from the position of FIG. 5, shown by broken lines, to its dumping position.

After the materials have been dumped from the container 32, the cylinders 74 and 74' are retracted to return the container 30 from the position of FIG. 6 to the position of FIG. 5. Power cylinders 58 and 58' are then retracted to return the container 30 to the transport position of FIG. 4. The container 30 is then transported to a collection site or the like while in the transport position. When the vehicle arrives at the collection site or the like, the power cylinders 58 and 58' are retracted so that the container 30 is moved from the position of FIG. 4 to the position of FIG. 3. Further retraction of the power cylinders 58 and 58' causes the container 30 to be moved from the position of FIG. 3 to the position of FIG. 2. The mechanisms 48 and 48' are then disconnected from the container 30 and the vehicle is moved away from the container 30.

Thus it can be seen that a novel apparatus has been provided which enables a filled or loaded recycle container to be raised from the ground from one side of the vehicle onto the vehicle so that the filled container may be transported from the collection site to a processing site. Once at the processing site, the contents of the container 30 are dumped from the other side of the vehicle without removing the container 30 from the vehicle.

It can therefore be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An apparatus for raising a loaded container from the ground onto a support on a wheeled vehicle, from one side thereof, transporting the loaded container to a remote location, dumping the contents of the container from an opposite side of the support, repositioning the dumped container on the support, transporting the empty container to a desired location, and moving the empty container from the support to the ground, the container including a bottom wall having a front end, a back end and first and second sides, a back wall extending upwardly from the back end of the bottom wall, a front wall extending upwardly and forwardly from the front end of the bottom wall, a first side wall extending upwardly from the first side of the bottom wall between the front and back walls thereof, and a second side wall extending upwardly from the second side of the bottom between the front and back walls thereof with the container having an open upper end, comprising:

the wheeled vehicle having a front end, a back end, a first side and a second side;

a container support on said wheeled vehicle having a front end, a back end, a first side and a second side;

a first elongated arm having first and second ends;

said first end of said first arm being pivotally secured to said container support adjacent the back end of said container support about a horizontal axis;

a first power cylinder including a cylinder portion and a cylinder rod movably extending therefrom which is movable between extended and retracted positions;

said first power cylinder being pivotally secured to said container support and said first arm and extending therebetween;

a second elongated arm having first and second ends;

said first end of said second arm being pivotally secured to said container support adjacent the front end of said container support about a horizontal axis;

a second power cylinder including a cylinder portion and a cylinder rod movably extending therefrom which is movable between extended and retracted positions;

said second power cylinder being pivotally secured to said container support and said second arm and extending therebetween;

said first and second arms being selectively pivotally movable by said first and second power cylinders between first, second and third positions relative to said container support; said second ends of said first and second arms being selectively pivotally secured to the container adjacent the upper end of the front wall of the container;

said second ends of said first and second arms being positioned adjacent the upper end of the front wall of the container when in their said first positions;

said first and second arms extending upwardly from said container support towards said second side thereof, when in their said second positions, whereby the bottom wall of the container is positioned on said container support in a transport position;

said first and second arms extending towards said second side of said container support in a generally horizontally disposed manner when said first and second arms are in their said third positions whereby the front wall of the container is generally horizontally disposed with the container being in a pre-dump position;

a third elongated arm having first and second ends;

said first end of said third arm being pivotally secured to said second end of said first arm;

a third power cylinder including a cylinder portion and a cylinder rod movably extending therefrom which is movable between extended and retracted positions;

said third power cylinder being pivotally secured to said first arm and said third arm and extending therebetween;

a fourth elongated arm having first and second ends;

said first end of said fourth arm being pivotally secured to said second end of said second arm;

a fourth power cylinder including a cylinder portion and a cylinder rod movably extending therefrom which is movable between extended and retracted positions;

said fourth power cylinder being pivotally secured to said second arm and said fourth arm and extending therebetween;

said second ends of said third and fourth arms being adapted to selectively movably engage the outer surface of the front wall of the container as said third and fourth power cylinders are extended and retracted;

the extension of said third and fourth power cylinders causing said third and fourth arms to pivotally move relative to said first and second arms when said first and second arms are in their said third positions; whereby the container is moved from its pre-dump position to a dump position so that the contents of the container are dumped from the second side of the vehicle.

2. The apparatus of claim 1 wherein a roller is mounted on the second ends of said third and fourth arms for engagement with the front wall of the container.

3. The apparatus of claim 1 wherein a roller is mounted on the first side of the vehicle for engagement with the container as the container is moved from the ground to its transport position.

4. The apparatus of claim 1 wherein the container is a recycle container.

* * * * *